United States Patent
Heo et al.

(10) Patent No.: US 9,258,092 B2
(45) Date of Patent: Feb. 9, 2016

(54) SOUNDING REFERENCE SIGNAL TRANSMISSION IN CARRIER AGGREGATION

(71) Applicant: BLACKBERRY LIMITED, Waterloo (CA)

(72) Inventors: Youn Hyoung Heo, Waterloo (CA); Mo-Han Fong, Ottawa (CA); Michael Eoin Buckley, Rolling Meadows, IL (US); Mark Earnshaw, Ottawa (CA); Zhijun Cai, Irving, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 78 days.

(21) Appl. No.: 13/840,677

(22) Filed: Mar. 15, 2013

(65) Prior Publication Data
US 2013/0242911 A1    Sep. 19, 2013

Related U.S. Application Data

(63) Continuation of application No. PCT/US2010/049408, filed on Sep. 17, 2010.

(51) Int. Cl.
*H04L 5/00* (2006.01)
*H04W 28/06* (2009.01)

(52) U.S. Cl.
CPC .............. *H04L 5/0048* (2013.01); *H04L 5/001* (2013.01); *H04L 5/0066* (2013.01); *H04L 5/0078* (2013.01); *H04L 5/0096* (2013.01); *H04W 28/06* (2013.01)

(58) Field of Classification Search
None
See application file for complete search history.

(56) References Cited

U.S. PATENT DOCUMENTS

| 2009/0109908 | A1  | 4/2009  | Bertrand et al. | |
|---|---|---|---|---|
| 2009/0196247 | A1  | 8/2009  | Fan et al. | |
| 2010/0103902 | A1* | 4/2010  | Kim et al. | 370/330 |
| 2011/0058505 | A1* | 3/2011  | Pan et al. | 370/280 |
| 2011/0249581 | A1* | 10/2011 | Jen | 370/252 |
| 2011/0268028 | A1* | 11/2011 | Stern-Berkowitz et al. | 370/328 |
| 2011/0287804 | A1* | 11/2011 | Seo et al. | 455/522 |
| 2011/0292823 | A1* | 12/2011 | Barbieri et al. | 370/252 |

(Continued)

FOREIGN PATENT DOCUMENTS

| CN | 101675696 | 3/2010 |
|---|---|---|
| WO | WO 2008/156293 A2 | 12/2008 |

(Continued)

OTHER PUBLICATIONS

International Search Report mailed May 9, 2011 in PCT/US2010/049408 filed Sep. 17, 2010.

(Continued)

*Primary Examiner* — Gary Mui
(74) *Attorney, Agent, or Firm* — Jeffrey N. Giunta; Fleit Gibbons Gutman Bongini & Bianco P.L.

(57) ABSTRACT

A cell-specific sounding reference symbol (SRS) subframe configuration and UE-specific SRS configuration are defined for carrier aggregation. For the cell-specific SRS subframe configuration, the same cell-specific SRS subframes are configured for all uplink (UL) carrier components (CCs). For the UE-specific SRS configuration, different configurations are applied for UL CCs. Also, to reduce signaling overhead, the different UE-specific SRS configuration is signaled by using an offset on top of the UE-specific SRS configuration of a primary component carrier (PCC).

14 Claims, 12 Drawing Sheets

(56) References Cited

U.S. PATENT DOCUMENTS

| | | | |
|---|---|---|---|
| 2012/0002568 A1* | 1/2012 | Tiirola et al. | 370/252 |
| 2012/0014358 A1* | 1/2012 | Pan et al. | 370/336 |
| 2012/0039273 A1* | 2/2012 | Nam et al. | 370/329 |
| 2012/0307779 A1* | 12/2012 | Noh et al. | 370/329 |
| 2012/0327883 A1* | 12/2012 | Yang et al. | 370/329 |

FOREIGN PATENT DOCUMENTS

| | | |
|---|---|---|
| WO | 2009058806 | 5/2009 |
| WO | WO 2010/077041 A2 | 7/2010 |

OTHER PUBLICATIONS

International Written Opinion mailed May 9, 2011 in PCT/US2010/049408 filed Sep. 17, 2010.
Texas Instruments: "SRS for Carrier Aggregation in LTE-Advanced", 3GPP Draft; R1-100458 TI SRS FOR CA, 3RD Generation Partnership Project (3GPP), Mobile Competence Centre; vol. RAN WG1, No. Valencia, Spain; Jan. 12, 2010.
NTT DOCOMO: "Views on SRS Enhancement for LTE-Advanced", 3GPP Draft; R1-102305 SRS Enhancement, 3RD Generation Partnership Project (3GPP), vol. RAN WG1, No. Beijing, China Apr. 6, 2010.
Texas Instruments: "Increasing Sounding Capacity for LTE-A", 3GPP Draft; R1-100745 TI Increasing Sounding Capacity for LTE-A R4, 3RD Generation Partnership Project (3GPP), vol. RAN WG1, No. Valencia, Spain; Jan. 2010.
Samsung: "SRS Transmission in LET-A", 3GPP Draft; R1-094576 LTE-A SRS, 3RD Generation Partnership Project (3GPP), No. Jeju; Nov. 9, 2011.
Texs Instruments: "Sounding Reference Signal in Support of Scheduling Request in E-UTRA", 3GPP Draft; R1-080185 SR1,3RD Generation Partnership Project (3GPP), vol. RAN WG1, No. Sevilla, Spain, Jan. 9, 2008.
Research in Motion et al: "Multiplexing SRS and other uplink channels for CA", 3GPP Draft; R1-106126 (RIM-SRS Multiplexing)_Final, 3RD Generation Partnership Project (3GPP), vol. RAN WG1, No. Jacksonville, USA; Nov. 9, 2010.
Ericsson et al: "Uplink power limitation handling for carrier aggregation", 3GPP Draft; R1-102616 Power Limitation for CA, 3RD Generation Partnership Project (3GPP), vol. RAN WG1, No. Montreal, Canada; May 7, 2010.
Motorola: Introduction of Rel-10 LTE-Advanced features in 36.213, 3GPP Draft; R1-105111 36213 Draft CR (REL-10, B) Intro REL-10 LTE-A Features, 3RD Generation Partnership Project (3GPP), vol. RAN WG1, No. Madrid, Spain; Sep. 14, 2010.
Research in Motion et al: "Remaining issue on power scaling for CA", 3GPP Draft; R1-106125 (RIM-SRS Power Control)_Final, 3RD Generation Partnership Project (3GPP), vol. RAN WG1, No. Jacksonville, USA, Nov. 9, 2010.
Samsung: "SRS Power Control in Rel.10", 3GPP Draft R1-105368 SRS TPC, 3RD Generation Partnership Project (3GPP), vol. RAN WG1, No. Xi'an, Oct. 5, 2010.
Nokia Siemens Networks et al: "Remaining issues on uplink power control", 3GPP Draft; R1-104438_Remaining_Issues_On_UL_PC, $3^{RD}$ Generation Partnership Project (3GPP), vol. RAN WG1 No. Madrid, Spain, Aug. 17, 2010.
Written Opinion dated May 16, 2013, in European Patent Application No. 10765532.6.
Office Action mailed Oct. 29, 2014, in Taiwan Application No. 100133510(with English Translation of the Search Report).
Canadian Office Action dated Dec. 1, 2014, received for Canadian Application No. 2,812,073.
Chinese Office Action dated Dec. 8, 2014, received for Chinese Application No. 20108006913.0.
Taiwanese Search Report dated May 1, 2015 for Taiwan ROC Application No. 100133510.

* cited by examiner

| srsSubframeConfiguration | Binary | Configuration Period $T_{SFC}$ (subframes) | Transmission offset $\Delta_{SFC}$ (subframes) |
|---|---|---|---|
| 0 | 0000 | 1 | {0} |
| 1 | 0001 | 2 | {0} |
| 2 | 0010 | 2 | {1} |
| 3 | 0011 | 5 | {0} |
| 4 | 0100 | 5 | {1} |
| 5 | 0101 | 5 | {2} |
| 6 | 0110 | 5 | {3} |
| 7 | 0111 | 5 | {0,1} |
| 8 | 1000 | 5 | {2,3} |
| 9 | 1001 | 10 | {0} |
| 10 | 1010 | 10 | {1} |
| 11 | 1011 | 10 | {2} |
| 12 | 1100 | 10 | {3} |
| 13 | 1101 | 10 | {0,1,2,3,4,6,8} |
| 14 | 1110 | 10 | {0,1,2,3,4,5,6,8} |
| 15 | 1111 | reserved | reserved |

*Figure 3A*
*(Prior Art)*

| srsSubframeConfiguration | Binary | Configuration Period $T_{SFC}$ (subframes) | Transmission offset $\Delta_{SFC}$ (subframes) |
|---|---|---|---|
| 0 | 0000 | 5 | {1} |
| 1 | 0001 | 5 | {1, 2} |
| 2 | 0010 | 5 | {1, 3} |
| 3 | 0011 | 5 | {1, 4} |
| 4 | 0100 | 5 | {1, 2, 3} |
| 5 | 0101 | 5 | {1, 2, 4} |
| 6 | 0110 | 5 | {1, 3, 4} |
| 7 | 0111 | 5 | {1, 2, 3, 4} |
| 8 | 1000 | 10 | {1, 2, 6} |
| 9 | 1001 | 10 | {1, 3, 6} |
| 10 | 1010 | 10 | {1, 6, 7} |
| 11 | 1011 | 10 | {1, 2, 6, 8} |
| 12 | 1100 | 10 | {1, 3, 6, 9} |
| 13 | 1101 | 10 | {1, 4, 6, 7} |
| 14 | 1110 | reserved | reserved |
| 15 | 1111 | reserved | reserved |

*Figure 3B*
*(Prior Art)*

| SRS Configuration Index $I_{SRS}$ | SRS Periodicity $T_{SRS}$ (ms) | SRS Subframe Offset $T_{offset}$ |
|---|---|---|
| 0 – 1 | 2 | $I_{SRS}$ |
| 2 – 6 | 5 | $I_{SRS} - 2$ |
| 7 – 16 | 10 | $I_{SRS} - 7$ |
| 17 – 36 | 20 | $I_{SRS} - 17$ |
| 37 – 76 | 40 | $I_{SRS} - 37$ |
| 77 – 156 | 80 | $I_{SRS} - 77$ |
| 157 – 316 | 160 | $I_{SRS} - 157$ |
| 317 – 636 | 320 | $I_{SRS} - 317$ |
| 637 – 1023 | Reserved | reserved |

*Figure 4A*
*(Prior Art)*

| Configuration Index $I_{SRS}$ | SRS Periodicity $T_{SRS}$ (ms) | SRS Subframe Offset $T_{offset}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10 – 14 | 5 | $I_{SRS} - 10$ |
| 15 – 24 | 10 | $I_{SRS} - 15$ |
| 25 – 44 | 20 | $I_{SRS} - 25$ |
| 45 – 84 | 40 | $I_{SRS} - 45$ |
| 85 – 164 | 80 | $I_{SRS} - 85$ |
| 165 – 324 | 160 | $I_{SRS} - 165$ |
| 325 – 644 | 320 | $I_{SRS} - 325$ |
| 645 – 1023 | reserved | reserved |

*Figure 4B*
*(Prior Art)*

(a) cell specific SRS subframe configuration is same (b) cell specific SRS subframe configuration is different

| Carrier index | SRS Configuration Index $I_{SRS}$ |
| --- | --- |
| 0 | srs-ConfigIndex |
| 1 | srs-ConfigIndex + srs-ConfigIndex-offset1 |
| 2 | srs-ConfigIndex + srs-ConfigIndex-offset2 |
| 3 | srs-ConfigIndex + srs-ConfigIndex-offset3 |

*Figure 7*

For SRS of PCC,

```
SoundingRS-UL-ConfigDedicated ::=   CHOICE(
    release                             NULL,
    setup                               SEQUENCE (
        srs-Bandwidth                       ENUMERATED (bw0, bw1, bw2, bw3),
        srs-HoppingBandwidth                ENUMERATED (hbw0, hbw1, hbw2, hbw3),
        freqDomainPosition                  INTEGER (0..23),
        duration                            BOOLEAN,
        srs-ConfigIndex                     INTEGER (0..1023),
        transmissionComb                    INTEGER (0..1),
        cyclicShift                         ENUMERATED (cs0, cs1, cs2, cs3, cs4, cs5, cs6,
            cs7)
    }
}
```

For SRS of SCC,

```
SoundingRS-UL-ConfigDedicated ::=   CHOICE(
    release                             NULL,
    setup                               SEQUENCE (
        srs-Bandwidth                       ENUMERATED (bw0, bw1, bw2, bw3),
        srs-HoppingBandwidth                ENUMERATED (hbw0, hbw1, hbw2, hbw3),
        freqDomainPosition                  INTEGER (0..23),
        duration                            BOOLEAN,
        srs-ConfigIndex-offset              INTEGER (0..15),
        transmissionComb                    INTEGER (0..1),
        cyclicShift                         ENUMERATED (cs0, cs1, cs2, cs3, cs4, cs5, cs6,
            cs7)
    }
}
```

*Figure 8*

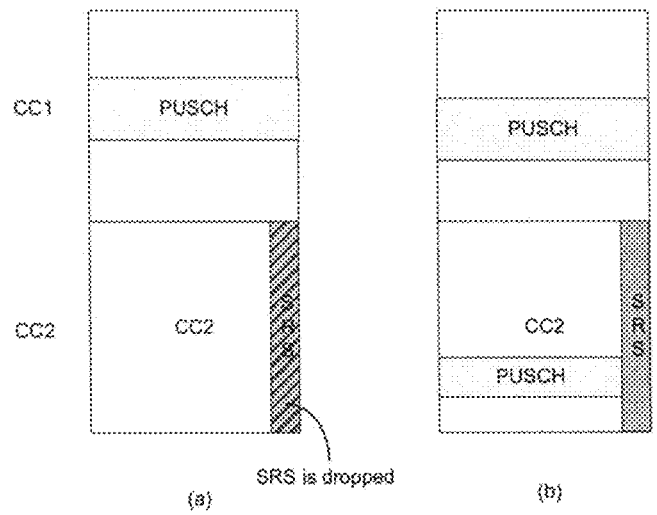
*Figure 9A*  *Figure 9B*
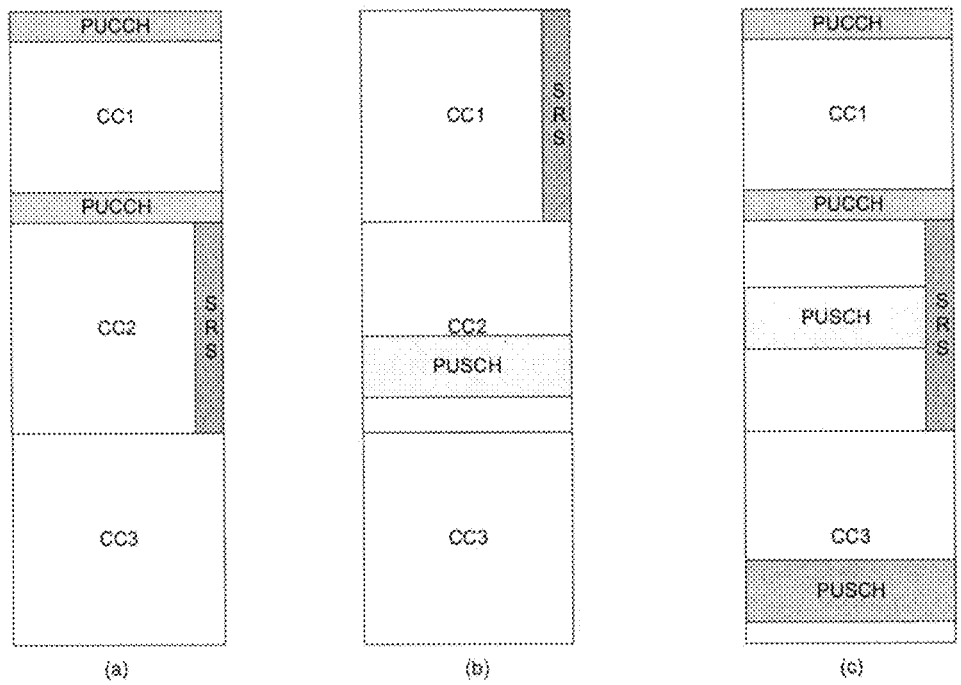
*Figure 10 A*  *Figure 10 B*  *Figure 10 C*

SOUNDING REFERENCE SIGNAL TRANSMISSION IN CARRIER AGGREGATION

CROSS REFERENCE TO RELATED APPLICATIONS

This application is a continuation of PCT/US2010/049408 filed on Sep. 17, 2010. The entire contents of the PCT international application are incorporated herein by reference.

BACKGROUND OF THE INVENTION

1. Field of the Invention

The present invention generally relates to data transmission in mobile communications systems and more particularly to sounding reference signal (SRS) transmission in carrier aggregation.

2. Description of the Related Art

In known wireless telecommunications systems, transmission equipment in a base station or access device transmits signals throughout a geographical region known as a cell. As technology has evolved, more advanced equipment has been introduced that can provide services that were not possible previously. This advanced equipment might include, for example, an E-UTRAN (evolved universal terrestrial radio access network) node B (eNB), a base station or other systems and devices. Such advanced or next generation equipment is often referred to as long-term evolution (LTE) equipment, and a packet-based network that uses such equipment is often referred to as an evolved packet system (EPS). An access device is any component, such as a traditional base station or an LTE eNB (Evolved Node B), that can provide a user agent (UA) such as user equipment (UE) with access to other components in a telecommunications system.

In mobile communication systems such as an E-UTRAN, the access device provides radio accesses to one or more UAs. The access device comprises a packet scheduler for allocating uplink (UL) and downlink (DL) data transmission resources among all the UAs communicating to the access device. The functions of the scheduler include, among others, dividing the available air interface capacity between the UAs, deciding the resources (e.g. sub-carrier frequencies and timing) to be used for each UA's packet data transmission, and monitoring packet allocation and system load. The scheduler allocates physical layer resources for physical downlink shared channel (PDSCH) and physical uplink shared channel (PUSCH) data transmissions, and sends scheduling information to the UAs through a control channel. The UAs refer to the scheduling information for the timing, frequency, data block size, modulation and coding of uplink and downlink transmissions.

In certain communication standards, such as the 3GPP ($3^{rd}$ Generation Partnership Project) communication standard, carrier aggregation will be used for LTE-Advanced to support wider transmission bandwidths and hence increase the potential peak data rate to meet LTE-A requirements. In carrier aggregation, multiple (e.g., up to a maximum of five) uplink component carriers (CCs) may be aggregated, and they can be configured for use for a user equipment (UE). FIG. 1 shows an example of carrier aggregation. In this example, each component carrier has a bandwidth of 20 MHz, and the total uplink system bandwidth is thus 100 MHz. Note, however, that fewer than the five uplink CCs shown in FIG. 1 may be allocated to a particular UE and that the bandwidths of different CCs need not necessarily be the same. The UE may transmit on a multiple of up to five uplink CCs depending on the UE's capabilities. In addition, depending on the deployment scenario, carrier aggregation may include carriers located in the same frequency band and/or carriers located in non-adjacent (non-contiguous) frequency bands. For example, one carrier may be located at a 2 GHz band and a second carrier may be located at a 800 MHz band. Because each CC operates independently, each CC can be considered as one cell. For this reason, CC, cell and carrier can be considered as equivalent. More specifically, the primary carrier can be called as the PCC (primary component carrier) or the primary cell. In addition, the secondary carrier can be called as the SCC (secondary component carrier) or the secondary cell.

In a known release of the LTE specification (LTE Release-8 system), the eNB may configure the UE to transmit a sounding reference signal (SRS) in just one subframe or periodically in multiple subframes. The main purpose of SRS transmission is to help the eNB estimate the uplink channel quality to support frequency-selective uplink scheduling. In addition, SRS may also be used to control uplink power or uplink timing advance.

In this known release, an SRS is transmitted in the last single carrier frequency division multiple access (SC-FDMA) symbol in a subframe for both frequency division duplexing (FDD) and time division duplexing (TDD) as shown in FIG. 2. In addition, for TDD, SC-FDMA symbol(s) in Uplink Pilot Time Slot (UpPTS) may be used for SRS.

In a given cell, SRS from multiple UEs may be multiplexed in several domains. More specifically, the UEs may be multiplexed via code division multiplexing (CDM), time division multiplexing (TDM), fine frequency division multiplexing (FDM), and coarse FDM. With CDM, UEs using different cyclic shifts for SRS are multiplexed in a subframe. Eight different cyclic shifts $n_{SRS}^{cs}$, are supported for SRS, which is defined in 3GPP, TS 36.211. With TDM, by allocating different periodicity and/or subframe offset, multiple UEs transmit SRS in different subframes. A SRS configuration index $I_{SRS}$ for SRS periodicity and SRS subframe offset $T_{offset}$ are defined in 3GPP, TS 36.211. With fine FDM, the multiplexing uses a transmission comb across subcarriers. More specifically, with fine FDM, multiple UEs can transmit SRS on different sets of subcarriers (combs) in frequency domain; a transmission comb ($k_{TC}$) is defined in 3GPP TS 36.211 and configured by higher layers. Since only a repetition factor of 2 is used in LTE, the set of possible values for $k_{TC}$ is {0, 1}. With coarse FDM, the multiplexing uses transmission bandwidth and frequency domain position. More specifically, different UEs can transmit SRS with different bandwidths and frequency domain location. The bandwidth and frequency domain position of SRS are configured by radio resource control (RRC) signaling. Because transmission of a large SRS bandwidth can require a larger transmit power compared to transmission of a narrow SRS bandwidth, a narrow bandwidth is preferable for cell-edge UEs. Due to this reason, each allowed configuration that is defined within the known release supports up to four different transmission bandwidth configurations, and the actual SRS bandwidth used for a transmission is dependent on both the configured cell specific SRS bandwidth parameter and the system bandwidth. Also, even if a small SRS bandwidth is configured for a UE, the eNB may be able to estimate the uplink channel quality of the entire bandwidth of this UE by using the frequency hopping of multiple SRS transmissions across multiple subframes. The parameters with respect to multiplexing are UE-specific parameters which are semi-statically configured by higher layers.

In the known release of the LTE specification, the eNB configures cell-specific SRS subframes and UE-specific SRS subframes. The cell-specific SRS configuration refers to SRS subframes reserved for potential SRS transmission from one or more UEs in a cell, while the UE-specific subframes indicate the subframes in which a particular UE should transmit SRS. Therefore, the cell-specific SRS subframe parameters are broadcast as system information, and the UE-specific SRS subframe parameters are signaled by dedicated RRC signaling to the particular UE.

Cell-specific SRS subframes are determined by the cell-specific subframe configuration period $T_{SFC}$ and the cell-specific subframe offset $\Delta_{SFC}$ which are listed in Tables shown in FIGS. 3A and 3B, for frequency division duplex (FDD) and time division duplex (TDD), respectively.

The parameter srsSubframeConfiguration is the cell-specific SRS subframe configuration index parameter which is broadcast in system information. Sounding reference signal subframes are the subframes satisfying $\lfloor n_s/2 \rfloor$ mod $T_{SFC} \in \Delta_{SFC}$, where $n_S$ is the slot index (where there are two slots per subframe and ten subframes per radio frame, so $0 \leq n_S \leq 19$). For configurations where multiple values of $\Delta_{SFC}$ are specified, SRS subframes are all the subframes satisfying the previous equation for all listed values of $\Delta_{SFC}$. For example, for srsSubframeConfiguration=13, subframes 0, 1, 2, 3, 4, 6 and 8 in each 10 ms radio frame will be reserved as cell-specific SRS subframes, but subframes 5, 7 and 9 will not be used for this purpose. For TDD, the sounding reference signal is transmitted only in configured uplink (UL) subframes or UpPTS.

The UE-specific SRS subframe configuration for SRS periodicity, $T_{SRS}$, and SRS subframe offset, $T_{offset}$, is defined in the tables shown in FIG. 4A and FIG. 4B, for FDD and TDD, respectively. The SRS Configuration Index $I_{SRS}$ is configured by higher layers. The periodicity $T_{SRS}$ of the SRS transmission is selected from the set {2, 5, 10, 20, 40, 80, 160, 320} ms (or corresponding 1 ms subframes). For the SRS periodicity $T_{SRS}$ of 2 ms in TDD, two SRS resources are configured in a half-frame containing UL subframe(s).

In the known release of the LTE specification, to preserve the single carrier property, multiple uplink channels shall not be transmitted simultaneously in the same subframe. Therefore, when transmission of SRS and other uplink channels occurs in a same subframe, a multiplexing rule is applied. More specifically, the multiplexing rule sets forth: when PUSCH is multiplexed with SRS, SRS is transmitted in the last symbol of the subframe and the last symbol of PUSCH is not transmitted and accordingly, Uplink Shared CHannel (UL-SCH) data is rate-matched to the number of available symbols for PUSCH transmission. When ACK/NACK carried in PUCCH (Physical Uplink Control Channel) format 1a or format 1b is multiplexed with SRS, the method of multiplexing depends on the higher-layer configured cell-specific parameter Simultaneous-AN-and-SRS. If Simultaneous-AN-and-SRS is enabled, SRS is transmitted in the last symbol and ACK/NACK is multiplexed with SRS by using the shortened format of PUCCH 1a/1b, otherwise, SRS transmission is dropped and only ACK/NACK in PUCCH format 1a/1b (if present) is transmitted. When channel quality information (CQI) in PUCCH format2/2a/2b is multiplexed with SRS, since both CQI (non-aperiodic CQI) and SRS are periodic and semi-statically configured by the eNB, the UE should assume that simultaneous transmission of periodic CQI and SRS should not happen and such situation is due to an incorrect configuration, therefore, there is no defined UE procedure for this case in the specification. For aperiodic CQI transmission, as it is always associated with a PUSCH transmission, the rule for multiplexing PUSCH and SRS as described herein is applicable. Furthermore when positive SR (Scheduling Request) is multiplexed with SRS, the same rule as multiplexing ACK/NACK and SRS is applied.

For all cell-specific SRS subframes, all UEs transmitting PUCCH 1/1a/1b should not transmit on the last SC-FDMA symbol of such SRS subframe, regardless of whether or not a particular UE is configured to transmit SRS in that subframe. However, for the case of a configured cell-specific SRS subframe when a UE is transmitting PUSCH but is not transmitting SRS, that PUSCH will be transmitted on the last symbol of any PUSCH RBs which are not overlapped with resource blocks (RBs) belonging to a configured cell-specific SRS bandwidth. PUSCH is not transmitted on the last symbols of any RBs which overlap with cell-specific SRS RBs.

Because the independent SRS is configured per CC, a simple configuration approach would be to signal a distinct SRS Configuration Index for each uplink CC for UE specific SRS subframe. However, this parameter requires 10 bits (to signal values from 0 to 1023 as discussed herein), so the total overhead would be 10 bits (per UL CC) multiplied by the number of UL CC.

Also, in the known release of the LTE specification, the UE behavior is defined when SRS and other uplink channels are simultaneously transmitted. One philosophy behind these UE behaviors is to maintain the single carrier property, i.e. single carrier based approach. In carrier aggregation, the single carrier property could be relaxed because the UE supports multi-carrier transmission of PUSCHs. For this reason, simultaneous PUSCH and PUCCH transmission is supported within a CC or across multiple CCs in LTE-A. However, out of band emissions are still of concern with the multi channel transmission. Therefore, it is desirable to support both transmission approaches, the single carrier based transmission approach and the multiple channel simultaneous transmission approach. The approach that is actually supported is configured by the eNB or decided by the UE as UE capability.

In an LTE-A system, the simultaneous transmission of PUSCH and PUCCH is supported because the UE is capable of transmitting multiple channels with carrier aggregation. Similar to simultaneous PUCCH and PUSCH transmission, it is necessary to support the simultaneous transmission of SRS and other uplink channels, i.e., PUSCH and PUCCH. To maintain backward compatibility, in certain systems it would be desirable to apply the same approach as in the known release of LTE specification on a per CC basis when SRS and other uplink channels are simultaneously transmitted within one CC. Another remaining issue is when SRS and other uplink channels are transmitted simultaneously in different CCs.

If simultaneous transmission of SRS and other uplink channels is allowed, an issue is present relating to how to scale the power of each channel when the calculated total transmit power exceeds the maximum allowed transmit power, i.e., a power-limited situation. Compared to other uplink channels, SRS may have to be treated in a different way because the power-limited situation may only happen on the last symbol in which SRS is transmitted. FIG. 5 shows a case where a power-limited situation occurs. More specifically, at the beginning of the subframe, the transmit power is lower than the maximum power because only PUSCH is transmitted. But, in the last symbol, the transmit power is larger than the maximum power because of the additional SRS transmission on CC1 together with the PUSCH transmission on CC2.

SUMMARY OF THE INVENTION

In accordance with an aspect of the present invention, a cell-specific sounding reference symbol (SRS) subframe configuration and UE-specific SRS configuration are defined for carrier aggregation. For the cell-specific SRS subframe configuration, in one embodiment, the same cell-specific SRS subframes are configured for all uplink (UL) carrier components (CCs). In another embodiment, different UL CCs may be configured with different cell-specific SRS subframe configurations. For the UE-specific SRS configuration, different configurations may be applied for different UL CCs allocated to the UE. Also, to reduce signaling overhead, the different UE-specific SRS configuration is signaled by using an offset or delta on top of the UE-specific SRS configuration of one of the CCs allocated to the UE, such as the primary component carrier (PCC).

Also in accordance with an aspect of the present invention, when SRS and other uplink channels happen to be transmitted on multiple UL CCs in the same subframe, a multiplexing rule for SRS transmission is defined. More specifically, if simultaneous transmission of SRS and other uplink channels is not allowed, SRS transmission is generally dropped if the SRS transmission occurs on the same subframe as another transmission on a different CC. However, even if the eNB configures such that the simultaneous transmission of SRS and other uplink channels on different CCs is not allowed, there may be an exception case that SRS could still be transmitted with other uplink channels. One exception case is that SRS is transmitted with the PUSCH within one CC and other uplink channels are also transmitted in other CCs all during the same subframe. In this case, two CCs are simultaneously transmitted in symbols for PUSCH. In addition, depending on the priority of uplink channels, the last symbol of other uplink channels could be dropped instead of dropping SRS. Alternatively, it is possible to support the simultaneous transmission of SRS and other uplink channels in the last symbol.

Also, in accordance with an aspect of the present invention, when SRS and other uplink channels are simultaneously transmitted in multiple UL CCs and the total transmit power exceeds the maximum allowed power, the UE is configured to reduce the transmit power of the UE. In various embodiments, different methods for reducing the transmit power are used. For example, in one method an equal scaling operation is applied, in certain embodiment, the scaling is formed at least in part by applying a signaled ratio. In another method, the PUSCH power is scaled down. In another method, the last symbol in a subframe of PUSCH is punctured when SRS is also transmitted. In another method, only the SRS transmission power is scaled down. In another method, the SRS is dropped.

Such a system allows configuration of multiple SRSs. More specifically, the eNB configures the same or different cell-specific SRS subframes for different CC and for each UE, different UE-specific SRS configuration for different CC may be configured. It is beneficial to avoid a Peak to Average Power Ratio (PAPR) issue caused by multiple SRSs transmission while reducing the puncturing of PUSCH or PUCCH due to the cell specific SRS subframes. An additional advantage is that the signaling methods reduce the signaling overhead.

With simultaneous transmission of SRS and other uplink channels, two methods are set forth to define SRS transmission when SRS and other uplink channels are transmitted in the same subframe. Each method may be suitable depending on whether the simultaneous transmission of control and data channels is supported or not. One benefit of these methods is that by providing two methods depending on whether the UE supports the simultaneous SRS and other uplink channels, the eNB has a flexibility to select the method considering the cell deployment or UE capability.

With the power control for SRS transmission in power limited situation, when SRS and other uplink channels are simultaneously transmitted, this method defines how to transmit multiple channels in case of the power limited situation. The method provides an efficient power utilization method because it reduces or punctures the power based on channel priority. Therefore, the method increases uplink spectral efficiency.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 3A and 3B, labeled Prior Art, generally referred to as FIG. 3, show tables of sounding reference signal subframe configurations.

FIGS. 4A and 4B, labeled Prior Art, generally referred to as FIG. 4, show tables of SRS Periodicity.

FIG. 7 shows a table of a UE specific SRS subframe.

FIG. 8 shows a table of an RRC information field.

FIGS. 9A and 9B, generally referred to as FIG. 9, show block diagrams of examples of simultaneous transmission of SRS and PUSCH transmissions.

FIGS. 10A, 10B and 10C, generally referred to as FIG. 10, show block diagrams of examples of simultaneous SRS and other uplink channels.

DETAILED DESCRIPTION

Figure 1:
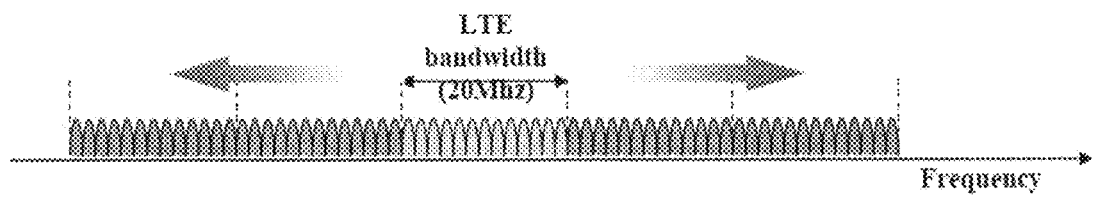
FIG. 1, labeled Prior Art, shows a block diagram of an example of uplink carrier aggregation.
Figure 2:
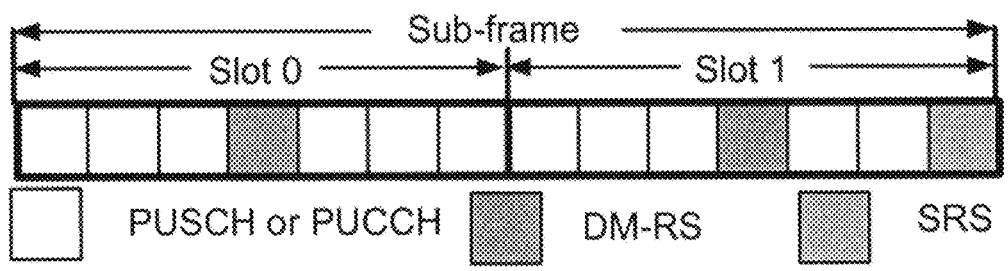
FIG. 2, labeled Prior Art, shows a block diagram of an SRS transmission.
Figure 5:
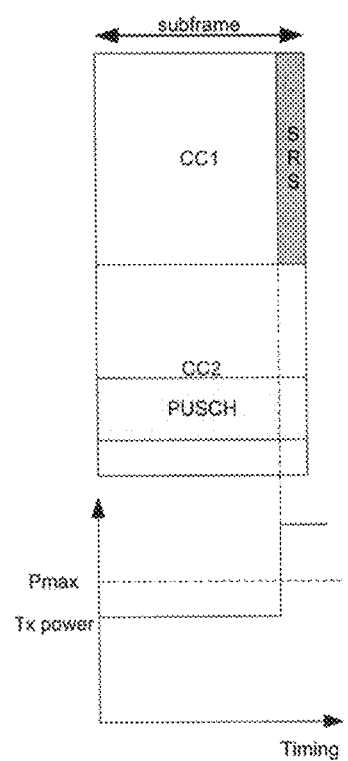
FIG. 5, labeled Prior Art, shows a block diagram of a power limited condition due to SRS transmission.
Figure 6A:
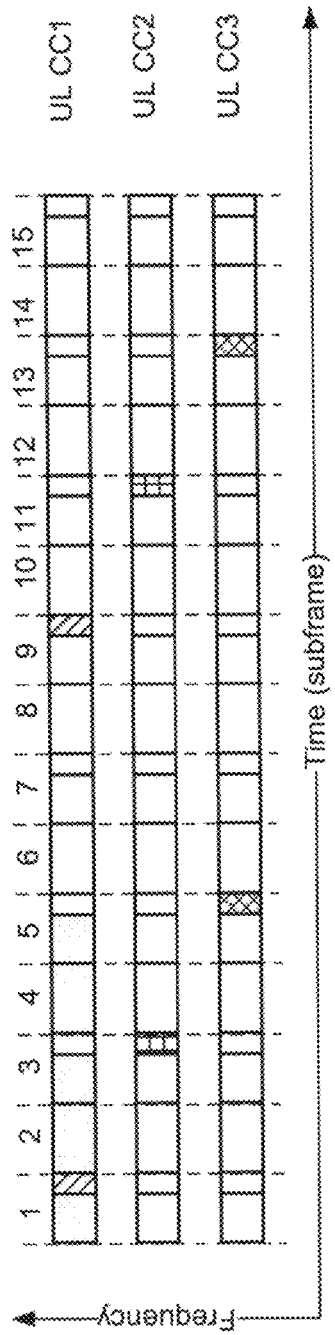
FIGS. 6A and 6B, generally referred to as FIG. 6, show block diagrams of examples of configuration of cell specific SRS subframes.
Figure 6B:
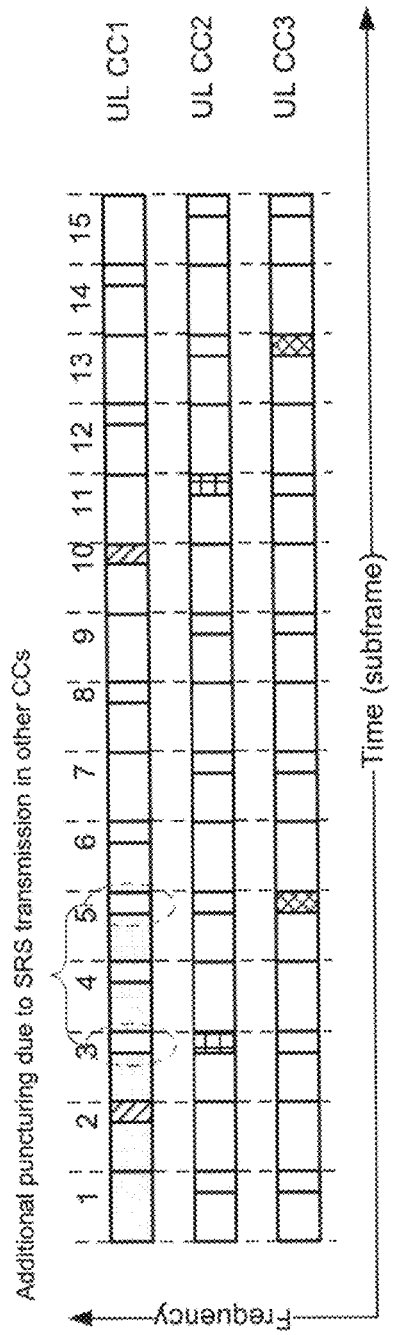

Referring to FIGS. 6A and 6B, generally referred to as FIG. 6, block diagrams of examples of configuration of cell specific SRS subframes are shown. More specifically, a method to reduce the overhead of signaling SRS subframes in carrier aggregation is set forth. Although it is desirable for a UE to transmit SRS for different UL CCs in different subframes to avoid a peak to average power ratio (PAPR) issue, there is benefit to assigning the same cell-specific SRS subframes between different UL CCs. As shown in FIG. 6A, uplink subframes are expected to be time-aligned between different UL CCs, since all UL CCs belong to the same eNB. FIG. 6A shows an example when cell-specific SRS subframes are aligned among multiple CCs, while FIG. 6B shows an example of when the cell-specific SRS subframes are different in multiple CCs.

In FIG. 6A, within the cell specific SRS subframe, certain areas (e.g., the first parts of UL CC1 subframe 1, 3 and 5 and all of UL CC1 subframe 2 and 4) indicate subframes configured by cell-specific SRS subframe configuration. In this example, the cross-hatched areas indicate the symbols on which actual SRS are transmitted from a particular UE on a particular carrier. The last symbol of PUSCH in such subframes should not be transmitted if the subframe is a cell-specific SRS subframe regardless of whether or not this UE actually transmits SRS in that subframe. Therefore, the last symbol in a subframe of PUSCH transmission on UL CC1 is punctured in subframes 1, 3, and 5. In addition, if the simultaneous SRS and other uplink channel transmission is not allowed, the UE may also not transmit any uplink channel in the last symbol of any CC when SRS is transmitted in any CCs. But, if the cell-specific SRS subframes are aligned between CCs, additional puncturing is not required because SRS in all CCs will occur in the same subframes.

If the cell-specific SRS subframes are different among different CCs as shown in the example of FIG. 6B, the last symbol in subframes 3 and 5 on all CCs would likely be punctured for the UE to transmit SRS in UL CC2 and UL CC3 if the simultaneous transmission of SRS and other uplink channels in the different CC is not allowed. The last symbol of subframes 2 and 4 is already not used for transmission on UL CC1 since these subframes are cell-specific SRS subframes on UL CC1 and would also be punctured on CC2 and CC3 if the simultaneous transmission of SRS and other uplink channels in the different CC is not allowed. Hence, the non-aligned SRS subframe configuration of FIG. 6B can lead to significant PUSCH "puncturing" in certain scenarios. When the cell-specific SRS subframes are the same between uplink CCs, the UE needs to receive the cell-specific SRS subframe configuration for only PCC. And, the UE assumes that the cell-specific SRS subframe configurations of other CCs is the same as that of the PCC. This actually saves the signaling overhead.

In another embodiment, cell-specific SRS subframes can be aligned between different CCs in the sense that the cell-specific SRS subframe configuration of one CC is a subset (rather than identical to) the cell-specific SRS subframe configuration of another CC. For example, CC1 could use srsSubframeConfiguration=4 from the Table shown in FIG. 4 while CC2 uses srsSubframeConfiguration=10. In this case, CC1 configures subframes 1 and 6 within each 10 ms frame as SRS frames, while CC2 configures subframe 1 within each frame as an SRS frame. This configuration allows a reduced amount of uplink resources to be dedicated to SRS for a particular carrier (if a full set of SRS resources for that carrier is not required), while still addressing the issue of SRS subframe alignment. In this case, the UE needs to receive the cell-specific SRS subframe configurations for multiple CCs.

In another embodiment, an aperiodic SRS transmission may be used to efficiently utilize the uplink SRS resources in the multi-antenna case. For example, the UE may be configured with periodic SRS transmission with long periods while whenever the uplink channel is needed to be estimated, e.g., uplink activities are expected due to the reception of the Scheduling Request/Buffer Status Report (SR/BSR), the eNB triggers one or multiple aperiodic SRS transmissions from the UE. In this way, the SRS resources can be efficiently utilized while the SRS transmission flexibility is maintained. For the aperiodic SRS resources, there may be cell-specific aperiodic SRS resource for each CC. If the eNB allocates the cell-specific aperiodic SRS resource, the SRS subframes for each CC could be aligned in order to address the issue of when subframes are not aligned as shown in FIG. 6B. In another embodiment, cell-specific aperiodic SRS subframes can be aligned between different CCs in the sense that the cell-specific aperiodic SRS subframe configuration of one CC is a subset of another CC. In yet another embodiment, the combination of the cell-specific periodic SRS subframes and the cell-specific aperiodic SRS subframes can be aligned among different CCs. In the case that no cell-specific aperiodic SRS subframes are configured, the aperiodic SRS resource will share the same cell-specific periodic SRS subframe configurations.

In another embodiment, the cell-specific SRS subframe alignment is only performed when simultaneous PUSCH and PUCCH transmission is not allowed. When simultaneous PUSCH and PUCCH transmission is allowed, the SRS subframes are allocated independently. Allocating the SRS subframes independently may provide a power allocation benefit. However, in this case, the UE needs to receive the cell-specific SRS subframe configurations for multiple CCs.

The UE-specific SRS configuration is defined by SRS periodicity, $T_{SRS}$, and SRS subframe offset. As discussed above, these parameters are derived by SRS Configuration Index $I_{SRS}$, which is signaled by higher layers. For carrier aggregation, the eNB can signal a different $I_{SRS}$ for each CC. Alternatively, the eNB can signal the absolute value of $I_{SRS}$ for a certain CC, e.g. Primary Component Carrier (PCC) and the offset of each CC is signaled. The Table shown in FIG. 7 provides a UE-specific subframe for this approach. More specifically, in this Table, the srs-ConfigIndex is Ism of CC0 (CC0 is the Primary Component Carrier or PCC) and the SRS configuration index srs-ConfigIndex-offset 1, srs-ConfigIndex-offset2 and srs-ConfigIndex-offset3 is signaled for CC1, CC2 and CC3, respectively. The UE calculates $I_{SRS}$ by using srs-ConfigIndex and each offset value. Because SRS periodicity is highly related to the UE mobility or cell loading situation, a similar periodicity can be applied for SRS for multiple CCs. The bits needed for the offset are much smaller than the bits needed for $I_{SRS}$. The signaled offset can be either a signed or unsigned quantity. In addition, values of srs-ConfigIndex+srs-ConfigIndex-offset may or may not be specified or configured to wrap-around within the SRS configuration index range having the same periodicity as the primary carrier (see e.g., Table shown in FIG. 4).

For example, if the srs-ConfigIndex ($I_{SRS}$) has a value of 315, which corresponds to an SRS periodicity of $T_{SRS}$=160 ms and an SRS subframe offset of $I_{SRS}$−157=158 and if wrap-around is configured or assumed, then an srs-ConfigIndex-offset value of 9 for the secondary carrier would correspond to an SRS periodicity $T_{SRS}$=160 ms and an SRS subframe offset $T_{offset}$=(315−157)+9 mod 160=7 (where 157 is the adjustment value for the SRS subframe offset and 160 is the SRS periodicity). If wrap-around is not configured or is specified not to be present, then the same SRS configuration parameters for the secondary carrier would result in an SRS periodicity $T_{SRS}$=320 ms and an SRS subframe offset $T_{offset}$=7.

In other embodiments, the offset values for secondary carriers are not necessarily signaled directly to a particular UE, but are instead either preconfigured (specified in the standard in TS 36.213) or one or more offset values are broadcast in system information and are applied automatically to the directly-signaled srs-ConfigIndex for the PCC. In another embodiment, a subset of potential offset values is broadcast within the system information, and the eNB directly signals indices (one index for each secondary component carrier (SCC)) into a table of offset values to a particular UE rather than signaling relative offset values directly. This embodiment has the potential to further reduce the number of bits required for signaling secondary carrier offset values. In another embodiment, all the SCC may have the same configuration compared with the PCC so one indication is sufficient.

The Table set forth in FIG. 8 shows an example of RRC signaling. To configure SRS of PCC, the same RRC information field is signaled, accordingly, there is no change in SRS information for PCC. However, to configure SRS of SCC, the srs-ConfigIndex-offset is signaled instead of the srs-Config-Index. In the example shown in FIG. 8, only 16 different offset values are defined, requiring 4 bits per carrier, as compared to the 10 bits per carrier of srs-ConfigIndex. Alternatively, the number of bits can be 8 bits to support a range of carrier offset values of 0-63. In this case, it is more flexible to allocate a different offset in case of large SRS periodicity such as 160 ms and sparse cell-specific SRS subframe configuration such as srs-subframeConfig=9/10/11/12 where there is only one SRS subframe per radio frame.

More specifically, when performing a UE sounding procedure, a UE will transmit SRS based on trigger type 0 and trigger type 1 where trigger type 0 relates to higher layer signaling and trigger type 1 relates to physical layer signaling (e.g. uplink (UL) grant or downlink (DL) grant). UL grant and DL grant means the physical layer signaling for PUSCH and PDSCH scheduling, respectively. A UE may be configured with SRS parameters for trigger type 0 and trigger type 1 on each serving cell. The SRS parameters are cell specific and for trigger type 0 semi-statically configurable by higher layers. The SRS parameters include a srs-ConfigIndex $I_{SRS,PCell}$ for SRS periodicity and SRS subframe offset, $T_{offset}$, as defined in the Tables shown in FIGS. 4A and 4B for the primary cell. srs-ConfigIndex $I_{SRS,c}$ for the $c^{th}$ secondary cell is defined by ($I_{SRS,PCell}$+srs-ConfigIndex-offset,c), and srs-ConfigIndex-offset,c is configured by higher layers.

The cell specific SRS transmission sub-frames of a cell are configured by higher layers. The allowable values for the cell specific SRS transmission sub-frames are provided in Section 5.5.3.3 of TS 36.211. The same cell specific SRS transmission subframes may be configured for a secondary cell.

Referring to FIGS. 9A and 9B, block diagrams of examples of simultaneous transmission of SRS and PUSCH transmissions are shown. When SRS and other uplink channels of multiple UL CCs happen to be transmitted in the same subframe, a multiplexing rule for SRS transmission should be defined. Similar to PUSCH and PUCCH transmission, two possible approaches can be defined.

In a first approach, simultaneous SRS and other uplink channel transmission is not allowed. In this approach, SRS is dropped if SRS is only transmitted in one carrier and other channels are simultaneously transmitted on the other carriers. FIG. 9A shows an example of SRS transmission using this first approach. More specifically, in this example, PUSCH is transmitted in CC1 and SRS is transmitted in CC2. In this example, SRS is dropped. However, as shown in FIG. 9B, SRS and PUSCH are transmitted in CC1 and another PUSCH is also transmitted in CC2. In this example, SRS can be transmitted without being dropped. One reason for this is that the UE already transmits the uplink signal over two CCs, therefore the simultaneous transmission would not increase the power level dramatically in the last symbol to transmit SRS. In addition, receiving SRS in the eNB is necessary for the eNB to estimate the channel in CC2 because it is more likely to schedule PUSCH transmission on CC2 again if PUSCH is already scheduled on CC2. In another embodiment, even in this case, the SRS could be dropped as well for the sake of the simplicity.

In another embodiment, when other uplink channels and SRS are transmitted in the different cells, either the last symbol of other uplink channels or SRS can be dropped based on the priority. One example is that if SRS is transmitted on the primary cell and PUSCH is transmitted on the secondary cell, the last symbol of PUSCH is not transmitted and SRS is transmitted. In another example, SRS to be transmitted on the secondary cell is dropped. In another example, if SRS is aperiodic SRS, the last SC-FDMA symbol of other uplink channels is dropped and aperiodic SRS is transmitted. The same rule can be applied for the case when the PUCCH for CQI and SRS happen to be transmitted simultaneously. The dropping can be determined based on the periodicity of CQI and SRS. If CQI periodicity is configured such that CQI is transmitted less often than SRS transmission, it is more important to transmit CQI correctly. In this case, SRS is dropped. Otherwise, the last symbol of PUCCH is dropped. In case of aperiodic SRS, if aperiodic SRS is prioritized over periodic CQI transmission, aperiodic SRS is transmitted and the last symbol of PUCCH is dropped. In case of PUCCH for A/N, it may be difficult to drop the last symbol because it can break the orthogonality between multiple UEs. However, even in this case, if the eNB configures to drop the last symbol of PUCCH for A/N, and then SRS is transmitted and the last symbol of PUCCH for A/N can be dropped.

More specifically, with this first approach, SRS is dropped whenever SRS and PUCCH are transmitted in the different serving cells in the same subframe. SRS is dropped when SRS only is transmitted in a serving cell and PUSCH is transmitted in other serving cell in the same subframe. However, if PUSCH is transmitted in the same serving cell on which SRS is transmitted, SRS is transmitted without dropping.

Referring to FIGS. 10A, 10B and 10C, block diagrams of examples of simultaneous SRS and other uplink transmissions are shown. In this second approach, simultaneous SRS and uplink channels transmission is allowed. All channels are transmitted simultaneously. However, when SRS and uplink channels are transmitted in the same carrier as shown in FIG. 10, the transmission follows the approach so that the last symbol of PUSCH should not be transmitted.

In another embodiment, PUCCH and SRS in the same carrier can be transmitted simultaneously if the simultaneous SRS and uplink transmission is allowed.

If the cell-specific SRS subframes are completely aligned between all of the UL CCs, there will be no transmission of PUSCH and PUCCH1/1a/1b transmissions on the last symbol of SRS subframes on all CCs. In this case, SRS should not be dropped even if the first approach is applied. Thus, a UE transmits SRS in the last SC-FDMA symbol and PUCCH in the other symbols when PUCCH and SRS are transmitted in the different serving cells in the same subframe.

In various embodiments, only one of the approaches is supported or both of them can be supported. If both approaches are supported, the eNB can configure which particular approach is used by RRC signaling when carrier aggregation is configured. Alternatively, the second approach can be automatically supported when the simultaneous PUSCH and PUCCH transmission is configured by the eNB.

More specifically, when performing a UE sounding procedure, the parameter pucchSRS-simultaneous transmission is configured by higher layers. If the parameter pucchSRS-simultaneous transmission is FALSE, SRS is dropped whenever SRS and PUCCH are transmitted in the different serving cells in the same subframe. If the parameter pucchSRS-simultaneous transmission is TRUE, a UE can transmit PUCCH and SRS simultaneously when PUCCH and SRS are transmitted in the different serving cells in the same subframe. In addition, when performing a UE sounding procedure, the parameter puschSRS-simultaneous transmission is configured by higher layers. If the parameter puschSRS-simultaneous transmission is FALSE, SRS is dropped whenever SRS and PUSCH are transmitted in the different serving cells in the same subframe. If the parameter puschSRS-simultaneous transmission is TRUE, a UE can transmit PUSCH and SRS simultaneously when PUSCH and SRS are transmitted in the different serving cells in the same subframe.

Also, in certain embodiments, the aperiodic SRS transmission may be used in many scenarios. For example, when periodic channel quality information (CQI) is multiplexed with aperiodic SRS. In this example, instead of leaving the UE operation undefined. The multiplexing rule can be defined such that the last symbol of periodic CQI or the entire CQI report will not be transmitted and instead aperiodic SRS signal will be transmitted. In another embodiment, the CQI may take the priority and the aperiodic SRS may be dropped.

As discussed herein, there may be some cases that SRS and other uplink channels can be simultaneously transmitted. In these cases, when the total transmit power exceeds the maximum allowable power, the transmit power at the last symbol should be scaled down such that the total transmit power is capped at or below the maximum allowable power. In carrier aggregation, two different maximum allowable powers are defined. One is CC specific maximum power, which limits the transmit power in each CC. The other is per UE maximum power, which limits the transmit power in UE i.e. for all CCs. Therefore, in the case when SRS and other uplink channels are transmitted within one CC, the total transmit power of SRS and other uplink channels should not exceed the CC specific maximum power and the UE maximum power. Meanwhile, when SRS and other uplink channels are transmitted on different CCs, SRS and other uplink channels should not exceed their own CC maximum power respectively and the total transmit power should not exceed the UE maximum power. Since the control channel is important, PUCCH is always prioritized over SRS, which means only the power of SRS is scaled down. And if PUSCH includes UCI (Uplink Control Information), this PUSCH is also prioritized over SRS which means only the power of SRS is scaled down.

In another embodiment, the above scaling rule may be configured/overwritten by the eNB rather than specified in a standard. In another embodiment, a scaling ratio is defined related to the priority, the higher the priority, the less the scaling down of the power. The eNB should signal the scaling ratio or the scaling ratio is pre-set in the standards.

When SRS and PUSCH without UCI are simultaneously transmitted in different CCs and the total transmit power exceeds the UE maximum power, one or more of the following options can be specified.

More specifically, in a first option equal scaling is applied. In this first option, SRS and PUSCH are equally scaled down such that the total power does not exceed the UE maximum power. Since the bandwidth of SRS and PUSCH is typically expected to be different, equal scaling is performed in terms of an estimated power spectral density. For example, the UE calculates the amount of power to be reduced and then this power is divided based on the ratio of the bandwidth of each channel.

The following is more detailed example for the equal scaling. If the total transmit power of the UE exceeds the UE specific maximum power ($\hat{P}_{PowerClass}$), the UE scales $\hat{P}_{PUSCH,c}(i)$ and $\hat{P}_{SRS,c}(i)$ for the serving cell c in subframe i such that the condition $$\sum_c w_c(i) \cdot \left( \max\{\hat{P}_{PUSCH,c}(i), \hat{P}_{SRS,c}(i)\} \right) \le \left( \hat{P}_{PowerClass} - \hat{P}_{PUCCH,c}(i) \right)$$

is satisfied where $\hat{P}_{PUCCH,c}(i)$ is the linear value of $P_{PUCCH,c}(i)$ and $\hat{P}_{SRS,c}(i)$, and $w_c(i)$ is a scaling factor of the maximum of $\hat{P}_{PUSCH,c}(i)$ and $\hat{P}_{SRS,c}(i)$ for serving cell c. In case there is no PUCCH transmission in subframe i $\hat{P}_{PUCCH}(i)=0$.

If the UE has PUSCH transmission with UCI on cell j and PUSCH without UCI in the remaining cells, and the total transmit power of the UE exceeds $\hat{P}_{PowerClass}$, the UE scales $\hat{P}_{PUSCH,c}(i)$ for the serving cells without UCI in subframe i such that the condition $$\sum_{c \ne j} w_c(i) \cdot \left( \max\{\hat{P}_{PUSCH,c}(i), \hat{P}_{SRS,c}(i)\} \right) \le \left( \hat{P}_{PowerClass} - \hat{P}_{PUSCH,j}(i) \right)$$

is satisfied where $\hat{P}_{PUSCH,j}(i)$ is the PUSCH transmit power for the cell with UCI and $w_c(i)$ is a scaling factor of maximum of $\hat{P}_{PUSCH,c}(i)$ and $\hat{P}_{SRS,c}(i)$ for serving cell c without UCI.

In another embodiment, power scaling can be performed at each SC-FDMA symbol level rather than at a per subframe level when SRS is transmitted with other uplink channels.

The following is more detailed example for the equal scaling at each SC-FDMA symbol. If the total transmit power of the UE exceeds $\hat{P}_{PowerClass}$, the UE scales $\hat{P}_{PUSCH,c}(i)$ for the serving cell c in subframe i except the last SC-FDMA symbol such that the condition $$\sum_c w_c(i) \cdot \hat{P}_{PUSCH,c}(i) \le \left( \hat{P}_{PowerClass} - \hat{P}_{PUCCH,c}(i) \right)$$

is satisfied where $\hat{P}_{PUCCH,c}(i)$ is the linear value of $P_{PUCCH,c}(i)$ and $w_c(i)$ is a scaling factor of $\hat{P}_{PUSCH,c}(i)$ for serving cell c. In the case there is no PUCCH transmission in subframe i $\hat{P}_{PUCCH}(i)=0$.

If the total transmit power of the UE exceeds $\hat{P}_{PowerClass}$, the UE scales $\hat{P}_{PUSCH,c}(i)$ and $\hat{P}_{SRS,c}(i)$ for the serving cell c at the last SC-FDMA symbol in subframe i such that the condition $$\sum_c w_c(i) \cdot \left( \hat{P}_{PUSCH,c}(i) + \hat{P}_{SRS,c}(i) \right) \le \left( \hat{P}_{PowerClass} - \hat{P}_{PUCCH,c}(i) \right)$$

is satisfied where $\hat{P}_{PUCCH,c}(i)$ is the linear value of $P_{PUCCH,c}(i)$ and $w_c(i)$ is a scaling factor of $\hat{P}_{PUSCH,c}(i)$ for serving cell c. In case there is no PUCCH transmission in subframe i $\hat{P}_{PUCCH}(i)=0$. For the serving cell, c, in which SRS is transmitted, $\hat{P}_{PUSCH,c}(i)$ is assumed as 0.

If the UE has PUSCH transmission with UCI on cell j and PUSCH without UCI in the remaining cells, and the total transmit power of the UE exceeds $\hat{P}_{PowerClass}$, the UE scales $\hat{P}_{PUSCH,c}(i)$ for the serving cells without UCI in subframe i except the last SC-FDMA symbol such that the condition:

$$\sum_{c \ne j} w_c(i) \cdot \hat{P}_{PUSCH,c}(i) \le \left( \hat{P}_{PowerClass} - \hat{P}_{PUSCH,j}(i) \right)$$

is satisfied where $\hat{P}_{PUSCH,j}(i)$ is the PUSCH transmit power for the cell with UCI and $w_c(i)$ is a scaling factor of $\hat{P}_{PUSCH,c}(i)$ for serving cell c without UCI.

If the UE has PUSCH transmission with UCI on cell j and PUSCH without UCI in the remaining cells, and the total transmit power of the UE exceeds $\hat{P}_{PowerClass}$, the UE scales $\hat{P}_{PUSCH,c}(i)$ for the serving cells without UCI at the last SC-FDMA symbol in subframe i such that the condition:

$$\sum_{c \neq j} w_c(i) \cdot \left( \hat{P}_{PUSCH,c}(i) + \hat{P}_{SRS,c}(i) \right) \leq \left( \hat{P}_{PowerClass} - \hat{P}_{PUSCH,j}(i) \right)$$

is satisfied where $\hat{P}_{PUSCH,j}(i)$ is the PUSCH transmit power for the cell with UCI and $w_c(i)$ is a scaling factor of $\hat{P}_{PUSCH,c}(i)$ for serving cell c without UCI. For the serving cell, c, in which SRS is transmitted, $\hat{P}_{PUSCH,c}(i)$ is assumed as 0.

In a variation of this option, an unequal scaling formed at least in part by a ratio is applied to SRS and PUSCH so the total power does not exceed the UE maximum power allowed. The ratio may be predefined or may be configured by RRC signaling. The bandwidth of SRS may also form part of the computation of the unequal scaling.

With this variation, $w_c(i)$ is configured by higher layers.

In a second option only PUSCH power is scaled down. In this second option, the SRS is transmitted with the same power as calculated. But, the PUSCH power is reduced so as not to exceed the UE maximum power.

The following is more detailed example for PUSCH scaling. If the UE has SRS on cell j and PUSCH without UCI in the remaining cells, and the total transmit power of the UE exceeds $\hat{P}_{PowerClass}$, the UE scales $\hat{P}_{PUSCH,c}(i)$ for the serving cells without UCI in subframe i such that the condition $$\sum_c w_c(i) \cdot \hat{P}_{PUSCH,c}(i) \leq \left( \hat{P}_{PowerClass} - \sum_c \hat{P}_{SRS,c}(i) \right)$$

is satisfied where $\hat{P}_{PUSCH,j}(i)$ is the PUSCH transmit power for the cell with UCI, $\hat{P}_{SRS,c}(i)$ is the linear value of $P_{SRS,c}(i)$ and $w_c(i)$ is a scaling factor of $\hat{P}_{PUSCH,c}(i)$ for serving cell c without UCI. For the serving cell, c, in which SRS is transmitted $\hat{P}_{PUSCH,c}(i)$ is assumed as 0.

In a third option, the last symbol of PUSCH is punctured. In this third option, the UE calculates the total power at the subframe when PUSCH is transmitted. Therefore, if the predicted transmit power exceeds the UE maximum power based on the calculated PUSCH and SRS power, the last symbol of PUSCH is punctured. The eNB can detect whether or not the last PUSCH symbol is transmitted by energy detection. If there are multiple PUSCHs, PUSCH for which puncturing should be applied can be determined based on the predefined rule. For example, PUSCH having the lowest carrier index is punctured.

In a fourth option, only SRS power is scaled down. In this fourth option, if Quadrature Amplitude Modulation (QAM) modulation is used, the power scaling of one PUSCH symbol may affect the channel estimation and decoding performance. In this case, scaling of SRS power is preferable to avoid performance degradation. Since the eNB schedules PUSCH modulation, the eNB has exact knowledge of PUSCH modulation.

More specifically, if the UE has SRS on cell j and PUSCH without UCI in the remaining cells, and the total transmit power of the UE exceeds $\hat{P}_{PowerClass}$, the power of SRS is scaled such than the total transmit power of the UE shall not exceed $\hat{P}_{PowerClass}$ After the power of SRS is scaled down to zero, if the total transmit power of the UE still exceeds $\hat{P}_{PowerClass}$, PUSCH is scaled based on the equation for the normal transmission.

In a fifth option, SRS is dropped. In this fifth option, if the transmit power exceeds the maximum power based on the calculated PUSCH and SRS power, the UE drops SRS transmission. The UE then transmits SRS in the next configured SRS timing.

In certain embodiments, multiple power options may be supported. If multiple options are supported, either the eNB or the UE will select which option is used. If the eNB selects the option, that choice is signaled to the UE by using RRC signaling. Alternatively, the eNB broadcasts the selected option in the system information via the Broadcast Control Channel (BCCH). In another embodiment, any of the third, fourth or fifth options is beneficial in 16QAM demodulation because the power of the last PUSCH symbol is the same as the remaining PUSCH symbols or the eNB does not need to modulate the last PUSCH symbol. In 16QAM modulation, if the power of each symbol is different (especially Reference Signals (RS) and data), it is difficult for the eNB to detect the amplitude correctly and hence the demodulation performance may be degraded. Accordingly, any of the third, fourth or fifth options can be used when the selected option is configured for use by the eNB and PUSCH is modulated with 16QAM. When PUSCH is modulated with Quadrature Phase Shift Keying (QPSK), other options can be selected.

In certain embodiments, power scaling can be performed at each SC-FDMA symbol level rather than at a per subframe level when SRS is transmitted with other uplink channels. With this type of power scaling, the power scaling is performed only in the last SC-FDMA symbol in which SRS is transmitted. This method is beneficial (especially for option 1 and option 2) because other PUSCH symbols except the last symbol are not scaled down. However, if the per symbol power scaling is not applicable due to hardware complexity, all symbols of PUSCH may be scaled down for option 1 and option 2 and only the last symbol for SRS.

Figure 11:
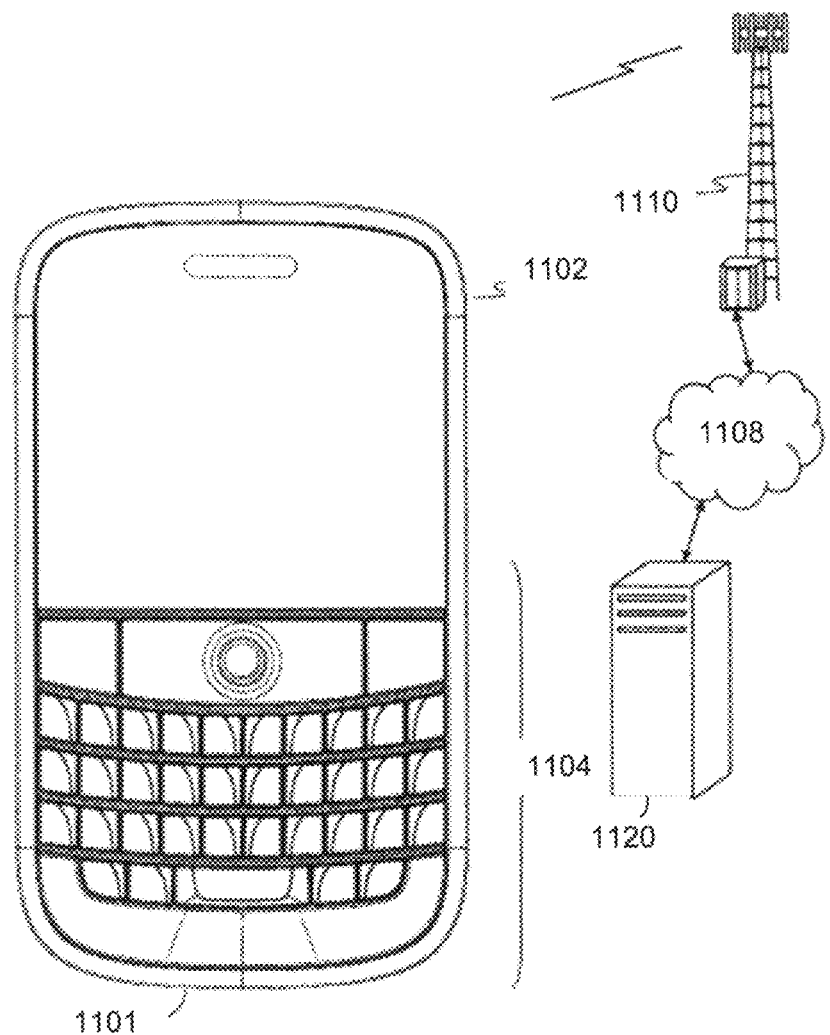
FIG. 11 shows a diagram of a wireless communications system including a UE.

FIG. 11 illustrates a wireless communications system including an embodiment of user agent (UA) 1101. UA 1101 is operable for implementing aspects of the disclosure, but the disclosure should not be limited to these implementations. Though illustrated as a mobile phone, the UA 1101 may take various forms including a wireless handset, a pager, a personal digital assistant (PDA), a portable computer, a tablet computer, a laptop computer. Many suitable devices combine some or all of these functions. In some embodiments of the disclosure, the UA 1101 is not a general purpose computing device like a portable, laptop or tablet computer, but rather is a special-purpose communications device such as a mobile phone, a wireless handset, a pager, a PDA, or a telecommunications device installed in a vehicle. The UA 1101 may also be a device, include a device, or be included in a device that has similar capabilities but that is not transportable, such as a desktop computer, a set-top box, or a network node. The UA 1101 may support specialized activities such as gaming, inventory control, job control, and/or task management functions, and so on.

The UA 1101 includes a display 1102. The UA 1101 also includes a touch-sensitive surface, a keyboard or other input keys generally referred as 1104 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UA 1101 may present options for the user to select, controls for the user to actuate, and/or cursors or other indicators for the user to direct.

The UA 1101 may further accept data entry from the user, including numbers to dial or various parameter values for configuring the operation of the UA 1101. The UA 1101 may further execute one or more software or firmware applications in response to user commands. These applications may configure the UA 1101 to perform various customized functions in response to user interaction. Additionally, the UA 1101 may be programmed and/or configured over-the-air, for example from a wireless base station, a wireless access point, or a peer UA 1101.

Among the various applications executable by the UA 1101 are a web browser, which enables the display 1102 to show a web page. The web page may be obtained via wireless communications with a wireless network access node, a cell tower 1110, a peer UA 1101, or any other wireless communication network or system 1100. The network 1100 is coupled to a wired network 1108, such as the Internet. Via the wireless link and the wired network, the UA 1101 has access to information on various servers, such as a server 1120. The server 1120 may provide content that may be shown on the display 1102. Alternately, the UA 1101 may access the network through a peer UA 1101 acting as an intermediary, in a relay type or hop type of connection.

Figure 12:
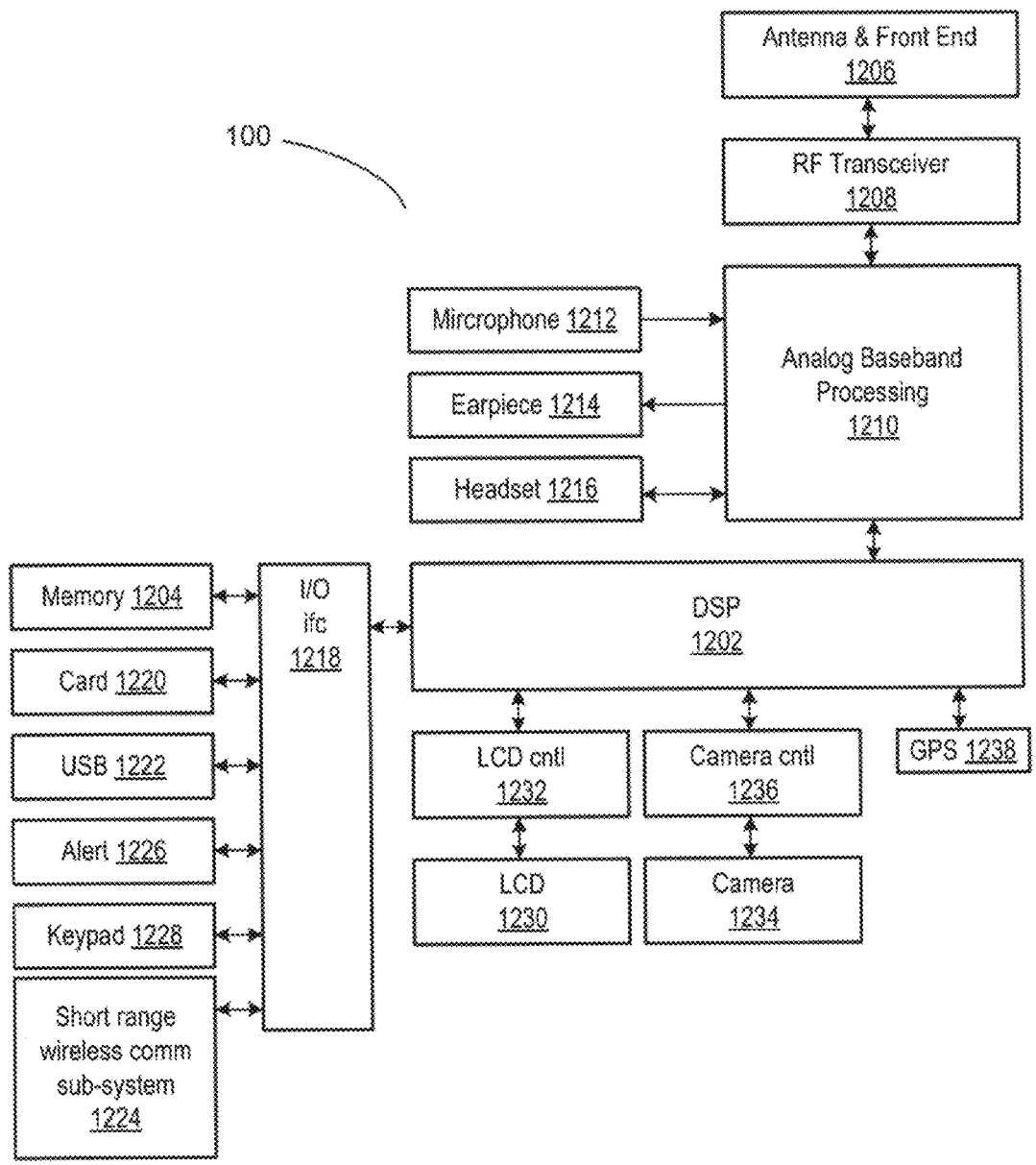
FIG. 12 shows a block diagram of a UE.

FIG. 12 shows a block diagram of the UA 1101. While a variety of known components of UAs 1101 are depicted, in an embodiment a subset of the listed components and/or additional components not listed may be included in the UA 1101. The UA 1101 includes a digital signal processor (DSP) 1202 and a memory 1204. As shown, the UA 1101 may further include an antenna and front end unit 1206, a radio frequency (RF) transceiver 1208, an analog baseband processing unit 1210, a microphone 1212, an earpiece speaker 1214, a headset port 1216, an input/output interface 1218, a removable memory card 1220, a universal serial bus (USB) port 1222, a short range wireless communication sub-system 1224, an alert 1226, a keypad 1228, a liquid crystal display (LCD), which may include a touch sensitive surface 1230, an LCD controller 1232, a charge-coupled device (CCD) camera 1234, a camera controller 1236, and a global positioning system (GPS) sensor 1238. In an embodiment, the UA 1101 may include another kind of display that does not provide a touch sensitive screen. In an embodiment, the DSP 1202 may communicate directly with the memory 1204 without passing through the input/output interface 1218.

The DSP 1202 or some other form of controller or central processing unit operates to control the various components of the UA 1101 in accordance with embedded software or firmware stored in memory 1204 or stored in memory contained within the DSP 1202 itself. In addition to the embedded software or firmware, the DSP 1202 may execute other applications stored in the memory 1204 or made available via information carrier media such as portable data storage media like the removable memory card 1220 or via wired or wireless network communications. The application software may comprise a compiled set of machine-readable instructions that configure the DSP 1202 to provide the desired functionality, or the application software may be high-level software instructions to be processed by an interpreter or compiler to indirectly configure the DSP 1202.

The antenna and front end unit 1206 may be provided to convert between wireless signals and electrical signals, enabling the UA 1101 to send and receive information from a cellular network or some other available wireless communications network or from a peer UA 1101. In an embodiment, the antenna and front end unit 1206 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 1206 may include antenna tuning and/or impedance matching components, RF power amplifiers, and/or low noise amplifiers.

The RF transceiver 1208 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 1210 and/or the DSP 1202 or other central processing unit. In some embodiments, the RF Transceiver 1208, portions of the Antenna and Front End 1206, and the analog base band processing unit 1210 may be combined in one or more processing units and/or application specific integrated circuits (ASICs).

The analog baseband processing unit 1210 may provide various analog processing of inputs and outputs, for example analog processing of inputs from the microphone 1212 and the headset 1216 and outputs to the earpiece 1214 and the headset 1216. To that end, the analog baseband processing unit 1210 may have ports for connecting to the built-in microphone 1212 and the earpiece speaker 1214 that enable the UA 1101 to be used as a cell phone. The analog baseband processing unit 1210 may further include a port for connecting to a headset or other hands-free microphone and speaker configuration. The analog baseband processing unit 1210 may provide digital-to-analog conversion in one signal direction and analog-to-digital conversion in the opposing signal direction. In some embodiments, at least some of the functionality of the analog baseband processing unit 1210 may be provided by digital processing components, for example by the DSP 1202 or by other central processing units.

The DSP 1202 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 1202 may perform modulation, coding, interleaving, and spreading, and for a receiver function the DSP 1202 may perform despreading, deinterleaving, decoding, and demodulation. In another embodiment, for example in an orthogonal frequency division multiple access (OFDMA) technology application, for the transmitter function the DSP 1202 may perform modulation, coding, interleaving, inverse fast Fourier transforming, and cyclic prefix appending, and for a receiver function the DSP 1202 may perform cyclic prefix removal, fast Fourier transforming, deinterleaving, decoding, and demodulation. In other wireless technology applications, yet other signal processing functions and combinations of signal processing functions may be performed by the DSP 1202.

The DSP 1202 may communicate with a wireless network via the analog baseband processing unit 1210. In some embodiments, the communication may provide Internet connectivity, enabling a user to gain access to content on the Internet and to send and receive e-mail or text messages. The input/output interface 1218 interconnects the DSP 1202 and various memories and interfaces. The memory 1204 and the removable memory card 1220 may provide software and data to configure the operation of the DSP 1202. Among the interfaces may be the USB interface 1222 and the short range wireless communication sub-system 1224. The USB interface 1222 may be used to charge the UA 1101 and may also enable the UA 1101 to function as a peripheral device to exchange information with a personal computer or other computer system. The short range wireless communication sub-system 1224 may include an infrared port, a Bluetooth interface, an IEEE 202.11 compliant wireless interface, or any other short range wireless communication sub-system, which may enable the UA 1101 to communicate wirelessly with other nearby mobile devices and/or wireless base stations.

The input/output interface 1218 may further connect the DSP 1202 to the alert 1226 that, when triggered, causes the UA 1101 to provide a notice to the user, for example, by ringing, playing a melody, or vibrating. The alert 1226 may serve as a mechanism for alerting the user to any of various events such as an incoming call, a new text message, and an appointment reminder by silently vibrating, or by playing a specific pre-assigned melody for a particular caller.

The keypad 1228 couples to the DSP 1202 via the interface 1218 to provide one mechanism for the user to make selections, enter information, and otherwise provide input to the UA 1101. The keyboard 1228 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 1230, which may include touch screen capability and also display text and/or graphics to the user. The LCD controller 1232 couples the DSP 1202 to the LCD 1230.

The CCD camera 1234, if equipped, enables the UA 1101 to take digital pictures. The DSP 1202 communicates with the CCD camera 1234 via the camera controller 1236. In another embodiment, a camera operating according to a technology other than Charge Coupled Device cameras may be employed. The GPS sensor 1238 is coupled to the DSP 1202 to decode global positioning system signals, thereby enabling the UA 1101 to determine its position. Various other peripherals may also be included to provide additional functions, e.g., radio and television reception.

Figure 13:
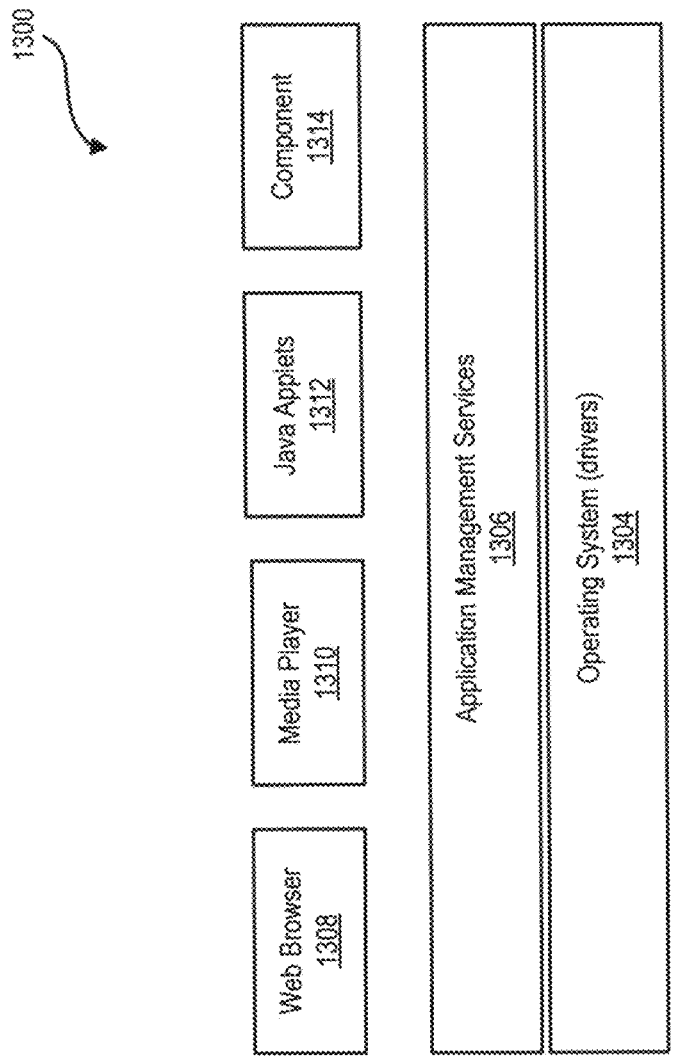
FIG. 13 shows a diagram of a software environment that may be implemented on a UE.

FIG. 13 illustrates a software environment 1302 that may be implemented by the DSP 1202. The DSP 1202 executes operating system drivers 1304 that provide a platform from which the rest of the software operates. The operating system drivers 1304 provide drivers for the UA hardware with standardized interfaces that are accessible to application software. The operating system drivers 1304 include application management services (AMS) 1306 that transfer control between applications running on the UA 1101. Also shown in FIG. 13 are a web browser application 1308, a media player application 1310, and Java applets 1312. The web browser application 1308 configures the UA 1101 to operate as a web browser, allowing a user to enter information into forms and select links to retrieve and view web pages. The media player application 1310 configures the UA 1101 to retrieve and play audio or audiovisual media. The Java applets 1312 configure the UA 1101 to provide games, utilities, and other functionality. A component 1314 might provide functionality described herein.

Figure 14:
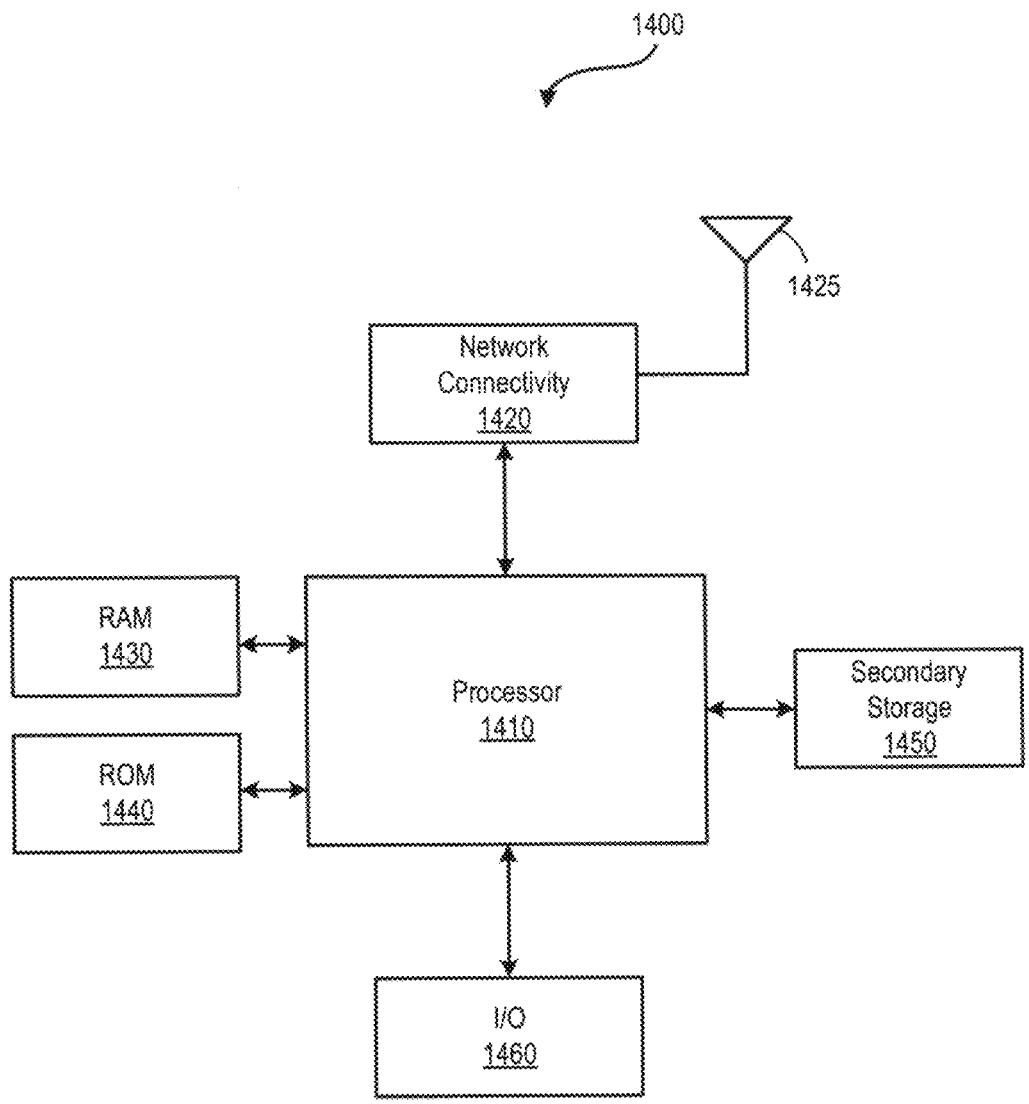
FIG. 14 shows a block diagram of an illustrative general purpose computer system.

The UA 1101, base station 1120, and other components described above might include a processing component that is capable of executing instructions related to the actions described above. FIG. 14 illustrates an example of a system 1400 that includes a processing component 1410 suitable for implementing one or more embodiments disclosed herein. In addition to the processor 1410 (which may be referred to as a central processor unit (CPU or DSP), the system 1400 might include network connectivity devices 1420, random access memory (RAM) 1430, read only memory (ROM) 1440, secondary storage 1450, and input/output (I/O) devices 1460. In some cases, some of these components may not be present or may be combined in various combinations with one another or with other components not shown. These components might be located in a single physical entity or in more than one physical entity. Any actions described herein as being taken by the processor 1410 might be taken by the processor 1410 alone or by the processor 1410 in conjunction with one or more components shown or not shown in the drawing.

The processor 1410 executes instructions, codes, computer programs, or scripts that it might access from the network connectivity devices 1420, RAM 1430, ROM 1440, or secondary storage 1450 (which might include various disk-based systems such as hard disk, floppy disk, or optical disk). While only one processor 1410 is shown, multiple processors may be present. Thus, while instructions may be discussed as being executed by a processor, the instructions may be executed simultaneously, serially, or otherwise by one or multiple processors. The processor 1410 may be implemented as one or more CPU chips.

The network connectivity devices 1420 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1420 may enable the processor 1410 to communicate with the Internet or one or more telecommunications networks or other networks from which the processor 1410 might receive information or to which the processor 1410 might output information.

The network connectivity devices 1420 might also include one or more transceiver components 1425 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1425 might include separate receiving and transmitting units or a single transceiver. Information transmitted or received by the transceiver 1425 may include data that has been processed by the processor 1410 or instructions that are to be executed by processor 1410. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1430 might be used to store volatile data and perhaps to store instructions that are executed by the processor 1410. The ROM 1440 is a non-volatile memory device that typically has a smaller memory capacity than the memory capacity of the secondary storage 1450. ROM 1440 might be used to store instructions and perhaps data that are read during execution of the instructions. Access to both RAM 1430 and ROM 1440 is typically faster than to secondary storage 1450. The secondary storage 1450 is typically comprised of one or more disk drives or tape drives and might be used for non-volatile storage of data or as an over-flow data storage device if RAM 1430 is not large enough to hold all working data. Secondary storage 1450 may be used to store programs that are loaded into RAM 1430 when such programs are selected for execution.

The I/O devices 1460 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1425 might be considered to be a component of the I/O devices 1460 instead of or in addition to being a component of the network connectivity devices 1420. Some or all of the I/O devices 1460 may be substantially similar to various components depicted in the previously described drawing of the UA 1101, such as the display 1102 and the input 1104.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

As used herein, the terms "user equipment" and "UE" can refer to wireless devices such as mobile telephones, personal digital assistants (PDAs), handheld or laptop computers, and similar devices or other user agents ("UAs") that have telecommunications capabilities. In some embodiments, a UE may refer to a mobile, wireless device. The term "UE" may also refer to devices that have similar capabilities but that are not generally transportable, such as desktop computers, set-top boxes, or network nodes.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made without departing from the spirit and scope disclosed herein. Although the present invention has been described in detail, it should be understood that various changes, substitutions and alterations can be made hereto without departing from the spirit and scope of the invention as defined by the appended claims.

What is claimed is:

1. A method for transmitting a sounding reference symbol (SRS) comprising:
    defining, in conjunction with carrier aggregation, a SRS configuration for a plurality of uplink component carriers (UL CCs) being aggregated for use by one user equipment transmitter,
    the SRS configuration comprising:
        a specification of a first plurality of offset values, the first plurality of offset values specifying offsets for transmission of SRS on a primary component carrier (PCC); and
        a specification of a plurality of secondary offset value indicators, each respective secondary offset value indicator in the plurality of secondary offset value indicators indicating a respective offset value within the first plurality of offset values;
    determining whether a SRS and other uplink channels are transmitted in the Physical Uplink Shared Channel (PUSCH) on multiple uplink (UL) component carriers (CCs) in a subframe; and,
    specifying, based on determining that the SRS and the other uplink channels are transmitted in the PUSCH on multiple uplink component carriers, a multiplexing rule for simultaneous transmission during the subframe of a SRS transmission and the other uplink channels on the multiple uplink component carriers,
    the specifying the multiplexing rule comprising specifying transmission of an SRS on at least one secondary component carrier (SCC) with at least one secondary offset value indicator within the plurality of secondary offset value indicators.

2. The method of claim 1 wherein:
    simultaneous transmission of SRS on a first uplink component carrier and other uplink channels in the PUSCH on uplink component carriers different from the first uplink component carrier during a SRS symbol is not allowed.

3. The method of claim 2 wherein:
the SRS transmission is dropped when a SRS transmission collides with a transmission on the different uplink component carrier.

4. The method of claim 2 wherein:
SRS is transmitted with other uplink channels in the same subframe when other uplink channels are transmitted in the PUSCH with SRS in the same uplink component carrier.

5. The method of claim 2 wherein:
other uplink channels to be transmitted on a secondary uplink component carrier are dropped based on transmitting the SRS on a primary uplink component carrier that is different than the secondary uplink component carrier.

6. The method of claim 1 wherein:
simultaneous transmission of SRS during a SRS symbol on at least one uplink component carrier and other uplink channels on different uplink component carriers during the SRS symbol is allowed.

7. The method of claim 6 further comprising:
simultaneously transmitting, without restriction, SRS in the last symbol on a first uplink component carrier and other uplink channels in the last symbol on other uplink component carriers that are different than the first uplink component carrier.

8. The method of claim 1 further comprising:
applying an indication of whether simultaneous transmission of SRS and other uplink channels is allowed.

9. The method of claim 1, wherein the determining further comprises determining whether the SRS and the other uplink channels are transmitted by a single user device on the multiple uplink (UL) component carriers (CCs) in the subframe.

10. The method of claim 1, wherein the plurality of secondary offset value indicators indicate a subset of offset values within the plurality of offset values, the subset of offset values having fewer elements that the plurality of offset values.

11. The method of claim 1,
wherein the defining the SRS configuration comprises defining a table specifying the plurality of secondary offset value indicators, and
wherein the specifying at least one secondary value offset indicator comprises specifying a respective index into the table.

12. The method of claim 1, the specifying the multiplexing rule further comprising specifying transmission of an SRS on the primary component carrier (SCC) by indicating at least one offset value within the first plurality of offset values.

13. An apparatus for transmitting a sounding reference symbol (SRS) comprising:
a processor;
memory coupled to the processor, the memory storing instructions executable by the processor for:
defining, in conjunction with carrier aggregation, a SRS configuration for a plurality of uplink component carriers (UL CCs) being aggregated for use by one user equipment transmitter,
the SRS configuration comprising:
a specification of a first plurality of offset values, the first plurality of offset values specifying offsets for transmission of SRS on a primary component carrier (PCC); and
a specification of a plurality of secondary offset value indicators, each respective secondary offset value indicator in the plurality of secondary offset value indicators indicating a respective offset value within the first plurality of offset values;
determining whether a SRS and other uplink channels are transmitted in the Physical Uplink Shared Channel (PUSCH) on multiple uplink (UL) component carriers (CCs) in a subframe; and,
specifying, based on determining that the SRS and the other uplink channels are transmitted in the PUSCH on multiple uplink component carriers, a multiplexing rule for simultaneous transmission during the subframe of a SRS transmission and the other uplink channels on the multiple uplink component carriers,
the specifying the multiplexing rule comprising specifying transmission of an SRS on at least one secondary component carrier (SCC) with at least one secondary offset value indicator within the plurality of secondary offset value indicators.

14. The apparatus of claim 13 wherein the memory further comprises instructions for:
applying an indication of whether simultaneous transmission of SRS and other uplink channels is allowed.

* * * * *